(12) United States Patent
Owens

(10) Patent No.: US 7,114,367 B1
(45) Date of Patent: Oct. 3, 2006

(54) PULMONARY FUNCTION TEST CALIBRATION SYSTEM AND METHOD

(76) Inventor: Norman L. Owens, 3644 New Karleen Rd., Hephzibah, GA (US) 30815

( * ) Notice: Subject to any disclaimer, the term of this patent is extended or adjusted under 35 U.S.C. 154(b) by 230 days.

(21) Appl. No.: 10/926,414

(22) Filed: Aug. 26, 2004

(51) Int. Cl.
*G01F 25/00* (2006.01)

(52) U.S. Cl. .......................................... 73/1.19; 73/1.23
(58) Field of Classification Search ................. 73/1.19, 73/1.23
See application file for complete search history.

(56) References Cited

U.S. PATENT DOCUMENTS

| | | | |
|---|---|---|---|
| 3,391,569 A | * | 7/1968 | Richard et al. ............... 73/1.22 |
| 4,203,316 A | * | 5/1980 | Jones .......................... 73/1.25 |
| 4,324,127 A | * | 4/1982 | Gazzara et al. .............. 73/1.22 |
| 5,076,093 A | * | 12/1991 | Jones et al. ................... 73/1.22 |
| 5,827,941 A | * | 10/1998 | Good et al. ................... 73/1.19 |

* cited by examiner

*Primary Examiner*—Hezron Williams
*Assistant Examiner*—Nashmiya S. Fayyaz
(74) *Attorney, Agent, or Firm*—Donald R. Schoonover

(57) ABSTRACT

A system for calibrating pulmonary function test equipment having syringe means, including a syringe having a cylindrically shaped sidewall, a proximal end with an centrally located orifice, a distal end with an output port, an interior cavity, and a plunger with a shaft slidably mounted through the orifice, a piston-type head mounted on one end of the shaft, and a handle mounted on an opposing end of the shaft; an FRC port; a rigid FRC bag connected in flow communication with the FRC port; control means having a plurality of stop mechanisms, including a first stop mechanism, a second stop mechanism structured to enable selective connection of the interior cavity in flow communication with the FRC port, and a third stop mechanism, and connection means structured to connect the syringe means to existing pulmonary function test equipment. A method of utilizing the system is also disclosed.

9 Claims, 2 Drawing Sheets

PULMONARY FUNCTION TEST CALIBRATION SYSTEM AND METHOD

BACKGROUND OF THE INVENTION

1. Field of the Invention

The present invention is related to medical equipment and, more specifically without limitation, to respiratory apparatus.

2. Definitions

As used herein, the following definitions and abbreviations have been applied:

PFT is an abbreviation for Pulmonary Function Test as hereinafter described;

TV is an abbreviation for Tidal Volume, which is defined as the volume of air that a subject breathes in and out while resting;

FVC is an abbreviation for Forced Vital Capacity, which is defined as the volume of air that a subject expels from maximum inhalation to maximum exhalation;

ERV is an abbreviation for Expiratory Reserve Volume, which is defined as the volume of air a subject expels from normal exhalation to maximum exhalation;

IRV is an abbreviation for Inspiratory Reserve Volume, which is defined as the volume of air a subject inhales from normal exhalation to maximum inhalation;

FRC is an abbreviation for Functional Residual Capacity, which is the sum of ERV and RV;

RV is an abbreviation for Residual Volume, which is the difference between FRC and ERV;

TLC is an abbreviation for Total Lung Capacity, which is the sum of SVC and RV;

DLCO is an abbreviation for Diffusion Lung Capacity of Carbon Monoxide, which is the quantity of carbon monoxide that is diffused from the lungs to the blood stream.

3. Discussion of the Related Art

PFT equipment typically includes three gas cylinders: (I) a cylinder that contains 100% pure oxygen, (ii) a cylinder that contains 3% carbon monoxide, and (iii) a cylinder that contains 10% helium. The PFT equipment also includes three independent analyzers: (I) either a nitrogen analyzer or an oxygen analyzer, (ii) a carbon monoxide analyzer, and (iii) a helium analyzer.

The primary purpose of PFT equipment is to measure the function and the activity of a human subject's lungs. The resulting test data is then compared to expected data correlated to the height, weight, age, and sex of the human subject being evaluated. A physician utilizes the PFT results to make a diagnosis and prescribe medication and treatment. In other words, it is absolutely imperative that collected PFT data be correct and accurate.

A PFT is used to assess potential pulmonary problems prior to surgery. A complete PFT includes the following procedures: (1) determination of the total lung capacity (TLC) of a subject's lungs; (2) determination of the tidal volume (TV) of the subject; (3) determination of the slow vital capacity (SVC) of the subject; and (4) determination of the expiratory reserve volume (ERV) of the subject. If the pre-operative respiratory status at least meets minimum acceptable PFT requirements, the subject is considered to be at a lower risk for post-operative complications. At times, a subject's surgery may be delayed or cancelled if the PFT results do not meet acceptable minimums.

In addition to the foregoing, PFT results are also used to assess impending respiratory failure in myasthenia gravis and Guillian-Barré patients. Such subjects may have neuromuscular disorders that can cause extreme weakness in, or paralysis of, the respiratory system. The measurements of vital capacity and negative inspiratory force are generally utilized as an integral part of the diagnosis for determination of respiratory failure. These tests can be performed at time intervals ranging from, for example, every hour to every eight hours to determine whether the patient may be subject to impending respiratory failure, which is generally demonstrated by a decreasing FVC value.

PFT results can also be used to assess a subject's response to bronchodilator therapy. Pre- and post-bronchodilator testing of the FVC can generally provide a reliable indication of the effectiveness of a bronchodilator. A determination can then be made as to the type of bronchodilator to be used, the preferred frequency of treatments, and the dosage amount that is appropriate for each particular patient.

PFT tests have been proven to be an effective means of evaluating the pulmonary status of a subject. PFT tests have been utilized for decades and continue to constitute a preferred state-of-the-art diagnostic procedure. Equipment and procedures for PFT tests are continuously being updated and improved to meet the constantly changing needs of pulmonary subjects.

Most PFT procedures are performed by a respiratory therapist (RT) under the direction of a physician. An RT is a professional who is thoroughly trained in PFT testing procedures and is skilled in calibrating PFT equipment, performing PFT tests, and interpreting PFT test results. Any abnormal results observed in a PFT are immediately communicated to the tending physician in order to provide the best possible care for the subject.

Presently, PFT equipment is calibrated by using a three-liter syringe for measuring gas volume. An RT normally conducts such calibrations by comparing two tests, a diffusion test and a quality control test, neither of which is overly reliable.

Equipment calibration involves the cleaning, maintenance, testing, and adjusting of various parameters. Equipment can lose calibration either if used frequently between calibrations, or if used too infrequently. If not frequently recalibrated, particulate matter may build up inside the equipment thereby contributing to operational inaccuracy of the equipment. It is therefore essential to calibrate PFT equipment regularly in order to ensure validity of test results. Each manufacturer of PFT equipment establishes recommended initial calibrations and provides specifications for the recommended frequency of calibration and the quantitative results to be expected during calibration of its PFT equipment. Hospital policies also establish calibration standards for PFT equipment used in its facilities.

Prior art equipment for PFT calibration, which can be described as follows, includes a cylindrically shaped syringe 10 having an interior cavity 12 with a capacity of three liters. The purpose of the syringe 10 is to mechanically duplicate the activity of the lungs of a human subject in order to calibrate TV, SVC, RV, ERV, FRC, DLCO, and TLC determinations of PFT equipment. A distal end 14 of the syringe 10 is removably connected via conduit 16 in flow communication with existing PFT equipment 18. The syringe 10 includes a plunger 20 having a piston-type head 22 mounted on a shaft 24. The shaft 24 slidably engages a centrally located orifice 26 through a proximal end 28 of the syringe 10. A handle 30 on the end of the shaft 24, opposite the head 22, provides means for manually displacing the head 22 back and forth within the interior cavity 12 of the syringe 10 as indicated by the arrow designated by numeral 32 in FIG. 2.

The plunger shaft 24 has indicia 34 and demarcations 36 thereon, as depicted in FIG. 3, which become visible as the plunger shaft 24 is pulled slidingly outwardly from the syringe 10. As the plunger 20 is positioned such that a selected one of the demarcations 36 is aligned with an outer surface 38 of the proximal end 28 of the syringe 10, an expellable volume of gas, as indicated by the indicia 34 associated with that particular demarcation 36, is captured between the head 22 and the distal end 14 of the internal cavity 12 of the syringe 10. If the plunger 20 is then displaced such that a different demarcation 36 is aligned with the outer surface 38 of the proximal end 28 of the syringe 10, the net volume change of the internal capacity 12 captured between the head 22 of the distal end 14 of the syringe 10 by displacing the plunger 20 from one to the other of those two selected demarcations 35 is the difference between the expellable volumes corresponding thereto. Generally, the volumes defined by the demarcations 36 are calibrated in one-half liter increments ranging from one-half liter to three liters.

Calibration of PFT equipment 18 includes a procedure commonly referred to as a DLCO test. A collapsible, variable capacity bag 40, commonly referred to as an FRC bag 40, having a capacity of one and one-half liters, is connected to a T-adapter 42. T-adapter 42 includes a restrictor 46 that prevents gas from flowing through T-adapter 42 until the gas in the bag 40 has been depleted. A gas source 48, such as a tank of 3% carbon monoxide, and a carbon monoxide analyzer 50 are connected in flow communication with the PFT equipment 18 as schematically indicated in FIG. 2. The PFT equipment 18 provided by some manufacturers utilizes an oxygen analyzer as analyzer 50 instead of a nitrogen analyzer which is only used in nitrogen wash-out test which measures FRC; however, the actual calculations are essentially identical.

To begin a nitrogen washout test, the FRC bag 40 is filled with atmospheric air (seventy-nine percent nitrogen, twenty-one percent oxygen); the gas source is 100% oxygen. The plunger 20 is then displaced to cause one-half liter increments of pure oxygen to flow from gas source 48, into the FRC bag 40. Outflow of gases from the FRC bag 40 is directed to analyzer 58 whereupon the percentage of nitrogen is determined by analyzer 50, and that percentage is mathematically converted to volume of nitrogen with each stroke of the plunger 20. The nitrogen washout test is complete when the analyzer 50 determines that the outflow into the analyzer 50 contains zero-percent nitrogen indicating that the atmospheric air in the FRC bag 40 has been replaced by pure oxygen. The sum of the successive volumes of nitrogen corresponding to the strokes of the plunger 20 is the total volume of the FRC bag 40. With this data from the nitrogen washout test, two values have been determined: VT and FRC. This is an indirect measurement.

Calibration of the PFT equipment 18 also includes a procedure commonly referred to as a helium dilution test. The only difference between the helium dilution test and the nitrogen washout test is that gas source 48 is a tank of ten-percent helium instead of a tank of pure oxygen, and analyzer 50 is a helium analyzer instead of a nitrogen or oxygen analyzer. The test is complete when the analyzer 50 determines that the outflow into the analyzer 50 contains the same % helium as the inflow percent of helium, indicating that the FRC bag 40 is free of atmospheric air and, instead, has the same percent of helium, sometimes referred to as equibilation. With this data from the helium dilution test, total volumes for FRC and TV are determined. The PFT equipment 18 provided by some manufacturers utilize one or the other, or both, tests for indirect measurement; however, both give essentially the same results.

Calibration of PFT equipment 18 also includes a procedure commonly referred to as an SVC test. This test is a single stroke test wherein the plunger 20, by means of the indicia 34 and demarcations 36, is displaced to expel two and one-half liters of gas from the syringe 10 into the PFT equipment 18.

Calibration of PFT equipment also includes a procedure commonly referred to as a DLCO test. The FRC bag 40 is not utilized for this test but, instead, is replaced by a fixed capacity bag 52, commonly referred to as a DLCO bag 52. Dilution occurs when gases are mixed; diffusion occurs when oxygen moves from the lungs to the blood system. Carbon monoxide is used because it has a greater propensity for blood. Prior to performing the diffusion test, a carbon monoxide (CO) analyzer is utilized as analyzer 50, and is calibrated to the percentage of gas in gas source 48, which for this test comprises a tank containing 3% carbon monoxide. Atmospheric air in the DLCO bag is allowed to mix with the three-percent carbon monoxide. After a twelve-second delay inside the three-liter syringe 10, the mixture is expelled into the PFT equipment 18 to be analyzed by carbon monoxide analyzer 50. Since the percent of carbon monoxide at the beginning of the test is known and since the carbon monoxide analyzer 50 determines the percent of carbon monoxide at the completion of the test, the difference between these two percentages provides the desired quantity.

It should be obvious that the accuracy and reproducibility of calibration of PFT equipment is highly user-dependent as each user may align the demarcations 36 differently each time the syringe is used. Further, each different user using the same syringe may align the demarcations 36 differently from that of other users.

What is needed is a system for calibrating PFT equipment that is more efficient, reduces the probability of error, and provides consistent results when used by multiple users.

PRINCIPAL OBJECTS AND ADVANTAGES OF THE INVENTION

The principal objects and advantages of the present invention include: providing an apparatus and method for external quality control of lung volume during nitrogen washout of a patient's lungs; providing such an apparatus and method for external quality control of lung volume during helium dilution of a patient's lungs; providing such an apparatus and method wherein data collected during such a washout or dilution can be displayed on a Levy Jennings chart; providing such an apparatus and method that assures accurate data acquisition during a pulmonary function test; providing such an apparatus and method that implements a laboratory proficiency test; providing such an apparatus and method that enables external calibration for daily use to collect, compile and compare data with similar types of equipment; providing such an apparatus and method for reporting necessary data for certification of use for pulmonary function tests; providing such an apparatus and method that enables early error detection in pulmonary function testing equipment; and generally providing such a device that is reliable in performance, capable of long lasting life, and particularly well adapted for the proposed usages thereof.

Other objects and advantages of this invention will become apparent from the following description taken in conjunction with the accompanying drawings wherein are set forth, by way of illustration and example, certain embodiments of this invention.

SUMMARY OF THE INVENTION

The improvements of the present invention include a system for calibrating pulmonary function test equipment. The system includes syringe means with a syringe having a cylindrically shaped sidewall, a proximal end with an centrally located orifice, a distal end with an output port, an interior cavity, and a plunger with a shaft slidably mounted through the orifice, a piston-type head mounted on one end of the shaft, and a handle mounted on an opposing end of the shaft.

The system also includes an FRC port, a collapsible FRC bag connected in flow communication with the FRC port, control means having a plurality of stop mechanisms, including a first stop mechanism, a second stop mechanism having first and second channels capable of connecting the interior cavity to the FRC port, and a third stop mechanism, and wherein each of said plurality of stop mechanisms includes a proximal end, extending exteriorly and transversely to the sidewall, and a distal end, a mounting mechanism wherein each stop mechanism is spring-mounted and slidably displaceable longitudinally wherein the distal end thereof extends into the interior cavity of the syringe, and a latching mechanism structured to latch the respective stop mechanism in an activated station wherein the distal end of the respective stop mechanism extends into the interior cavity of the syringe, and to release the respective stop mechanism to automatically return to a deactivated station wherein the distal end of the respective stop mechanism does not extend into the interior cavity of the syringe, wherein the plurality of stop mechanisms are axially spaced along the syringe such that a predetermined volume of the interior cavity is defined between that axial spacing of the respective stop mechanism and the distal end of the interior cavity.

The system also includes connection means having a first configuration and a second configuration wherein the first configuration includes a flexible conduit removably connecting the output port in flow communication with existing PFT equipment, the flexible conduit including a T-adapter, a DLCO bag connected in flow communication with the T-adapter, and a restrictor structured to prevent gas from flowing from the PFT equipment through the T-adapter until the gas in the DLCO bag has been depleted; and the second configuration includes a flexible conduit removably connecting output port in flow communication with the existing PFT equipment.

The improvements of the present invention also includes a method of utilizing the inventive system.

BRIEF DESCRIPTION OF THE DRAWING FIGURES

DETAILED DESCRIPTION OF THE INVENTION

As required, embodiments of the present invention are disclosed herein, however, it is to be understood that the disclosed embodiments are merely exemplary of the invention, which may be embodied in various forms. Therefore, specific structural and functional details disclosed herein are not to be interpreted as limiting, but merely as a basis for claims and as a representative basis for teaching one skilled in the art to variously employ the present invention in virtually any appropriately detailed structure.

The present invention provides a system for calibrating PFT equipment that is more efficient, reduces the probability of error, and provides consistent results when used by multiple users. As with prior art devices hereinbefore described, the purpose of the present invention is to mechanically duplicate the activity of the lungs of a human subject in order to calibrate the TV, FVC, RV, ERV, FRC, DLCO, and TLC determinations of PFT equipment.

Figure 1:
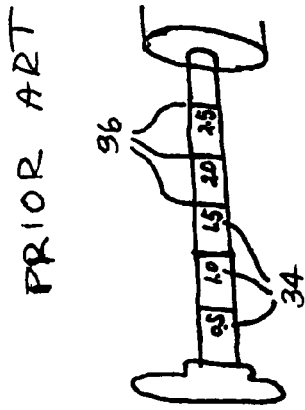
FIG. 1 is a schematic representation of the interrelationship of breathing volume terminology.
Figure 2:
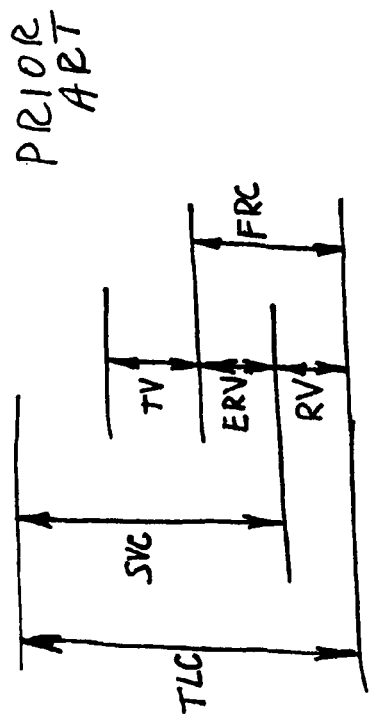
FIG. 2 is a schematic representation of a prior art syringe arrangement for calibrating PFT equipment.
Figure 3:
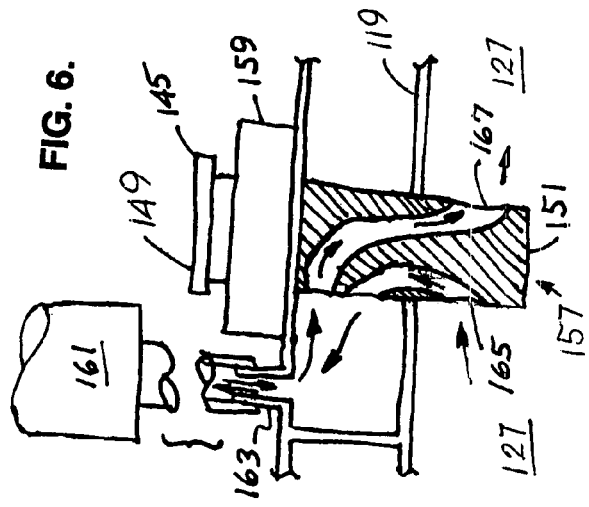
FIG. 3 is a perspective view of the indicia and demarcations of a prior art syringe shaft.
Figure 6:
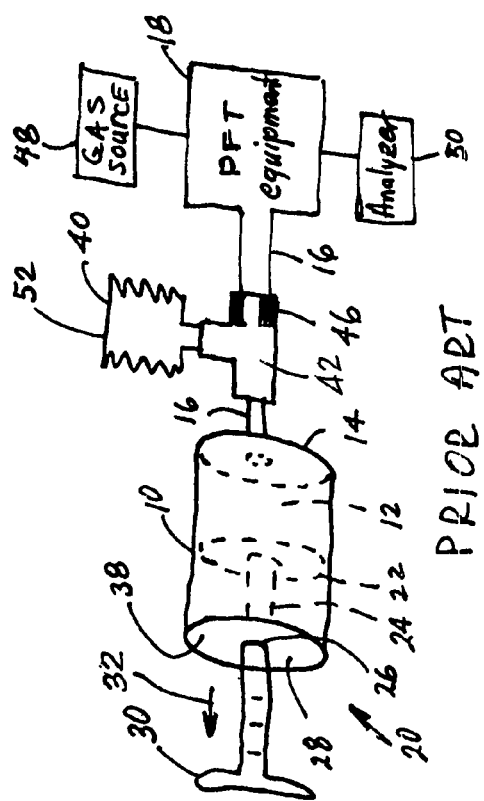
FIG. 6 is an enlarged and fragmentary, cross-sectional view of a second stop mechanism of the pulmonary function test calibration system, according to the present invention.
Figure 4:
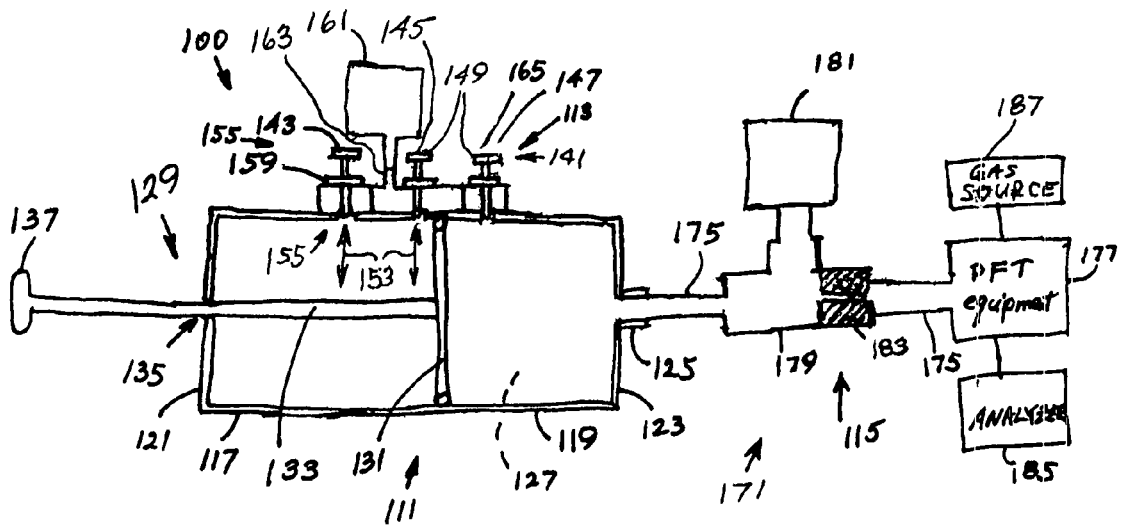
FIG. 4 is a schematic representation and partially cross-sectional view of a first configuration of the pulmonary function test calibration system, according to the present invention.
Figure 5:
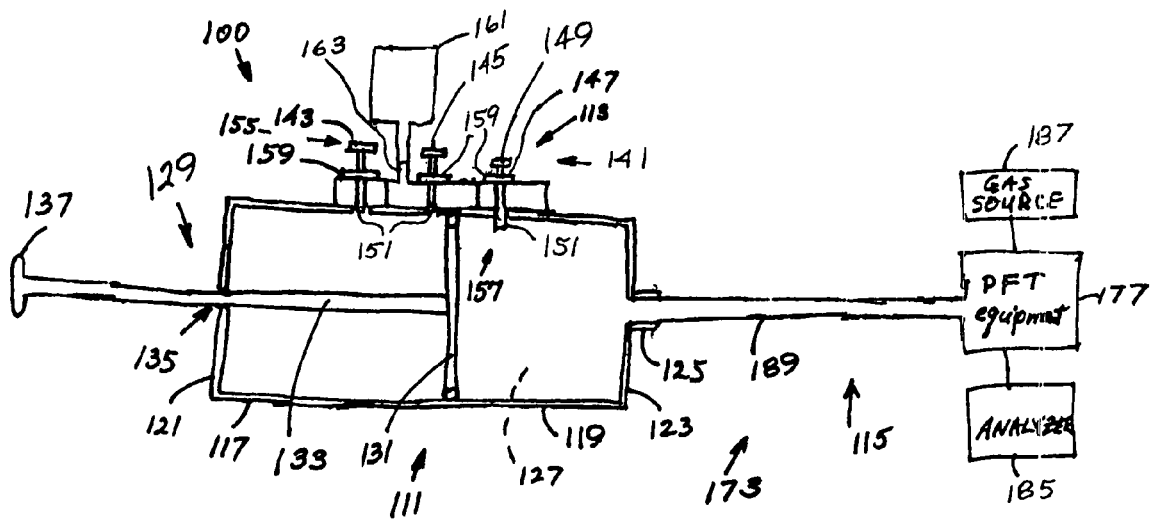
FIG. 5 is a schematic representation and partially cross-sectional view of a second configuration of the pulmonary function test calibration system, according to the present invention.

The reference numeral 100 generally refers to a pulmonary function test calibration system in accordance with the present invention, as shown in FIGS. 4 through 6. The PFT calibration system 100 of the present invention comprises syringe means 111, control means 113, and connection means 115.

The syringe means 111 includes a cylindrically shaped syringe 117 having a cylindrically shaped sidewall 119, a proximal end 121, a distal end 123 with a port 125, and an interior cavity 127, preferably having a capacity of three liters. The syringe 117 includes a plunger 129 having a piston-type head 131 mounted on a shaft 133. The shaft 133 slidably engages a centrally located orifice 135 through the proximal end 121 of the syringe 117. A handle 137 on the end of the shaft 133, opposite the head 131, provides means for manually displacing the head 131 back and forth within the interior cavity 127 of the syringe 117.

The control means 113 comprises a plurality of spring-mounted stop mechanisms 141 including a first stop mechanism 143, a second stop mechanism 145, and a third stop mechanism 147. Each of the plurality of stop mechanisms 141 has a proximal end 149 that extends exteriorly and transversely to the sidewall 119 of the syringe 117, and each of the plurality of stop mechanisms 141 also has a distal end 151. The plurality of stop mechanisms 141 are mounted such that each can be slidably displaced longitudinally, as indicated by the arrow designated by numeral 153 whereby the distal ends 151 thereof can be longitudinally displaced to extend into the interior cavity 127 of the syringe 117. Each of the plurality of stop mechanisms 141 has a deactivated station 155 whereat the distal end 151 thereof does not extend into the interior cavity 127 of the syringe 117, and an activated station 157 whereat the distal end 151 thereof does extend into the interior cavity 127 of the syringe 117, as shown in FIGS. 5 and 6.

Each of the plurality of stop mechanisms 141 includes a latching mechanism 159 that releasably latches the respective stop mechanism in the activated station 157. The latching mechanisms 159 are structured such that, as a selected one of the plurality of stop mechanisms 141 is manually displaced longitudinally from its deactivated station 155 to its activated station 157, the latching mechanism 159 latches the stop mechanism in the activated station 157 with the distal end 151 of the respective stop mechanism protruding into the interior cavity 127 of the syringe 117. The latching mechanism 159 of a selected one of the plurality of stop mechanisms 141 disposed at its activated station 157 is releasable by pressing the proximal end 149 of the stop mechanism longitudinally inwardly toward the sidewall 119 of the syringe 117 and then releasing the proximal end 149 whereupon the spring mounting of the respective stop mechanism automatically returns that stop mechanism to its deactivated station 155.

The plurality of stop mechanisms 141 are spaced longitudinally along the syringe 117 as described hereinbelow. The first stop mechanism 143 is spaced relative to the syringe 117 such that, with the first stop mechanism 143 disposed at its activated station 157, the second and third stop mechanisms 145, 147 disposed at their deactivated stations 155, the head 131 of the plunger 129 spaced between the first stop mechanism 143 and the distal end 123 of the syringe 117, and the head 131 of the plunger 129 placed in abutting engagement with the distal end 151 of the first stop mechanism 143, a full displacement of the head 131 of the plunger 129 from its abutting engagement with the distal end 151 of the first stop mechanism 143 to an abutting engagement with the distal end 123 of the syringe 117 causes a known volume of gas, for example two liters of gas depending on the location of the first stop mechanism 143 relative to the distal end 123 of the interior cavity 127 of the syringe 117, to be expelled from the interior cavity 127 through the port 125 of the syringe 117.

In other words, the first stop mechanism 143 provides a fixed mechanical stop that establishes an accurate and reproducible location for the head 131 of the plunger 129 wherein that location is equivalent to one of the demarcations of prior art syringes. More specifically, reliance on user-dependent alignment of demarcations on the shaft of a syringe plunger and possible inadvertent mis-reading of the associated indicia have been entirely eliminated.

The second stop mechanism 145 is spaced relative the syringe 117 such that, with the second stop mechanism 145 disposed at its activated station 157, the third stop mechanism 147 disposed at its deactivated station 155, the head 131 of the plunger 129 spaced between the second stop mechanism 145 and the distal end 123 of the syringe 117, and the head 131 of the plunger 129 placed in abutting engagement with the distal end 151 of the second stop mechanism 145, a full displacement of the head 131 of the plunger 129 from its abutting engagement with the distal end 151 of the second stop mechanism 145 to an abutting engagement with the distal end 123 of the syringe 117 causes a known volume of gas, for example one and one-half liters of gas, to be expelled from the interior cavity 127 through the port 125 of the syringe 117.

Again, the second stop mechanism 145 provides a fixed mechanical stop that establishes an accurate and reproducible location for the head 131 of the plunger 129 wherein that location is equivalent to another one of the demarcations of prior art syringes.

The third stop mechanism 147 is spaced relative to the syringe 117 such that, with the third stop mechanism 147 disposed at its activated station 157, the head 131 of the plunger 129 spaced between the third stop mechanism 147 and the distal end 123 of the syringe 117, and the head 131 of the plunger 129 placed in abutting engagement with the distal end 151 of the third stop mechanism 147, a full displacement of the head 131 of the plunger 129 from its abutting engagement with the distal end 151 of the third stop mechanism 147 to an abutting engagement with the distal end 123 of the syringe 117 causes a known volume of gas, for example one liter of gas, to be expelled from the interior cavity 127 through the port 125 of the syringe 117.

Yet again, the third stop mechanism 147 provides a fixed mechanical stop that establishes an accurate and reproducible location for the head 131 of the plunger 129 wherein that location is equivalent to yet another one of the demarcations of prior art syringes.

Further, the first and second stop mechanisms 143, 145 are spaced relative to each other such that, with the first and second stop mechanisms 143, 145 disposed at their activated stations 157, the head 131 of the plunger 129 spaced between the first and second stop mechanisms 143, 145, and the head 131 of the plunger 129 placed in abutting engagement with the distal end 151 of the first stop mechanism 143, a full displacement of the head 131 of the plunger 129 from its abutting engagement with the distal end 151 of the first stop mechanism 143 to an abutting engagement with the distal end 151 of the second stop mechanism 145 causes a known volume of gas, for example one-half liter of gas, to be expelled from the interior cavity 127 through port 125 of the syringe 117.

Similarly, the second and third stop mechanisms 145, 147 are spaced relative to each other such that, with the second and third stop mechanisms 145, 147 disposed at their activated stations 157, the head 131 of the plunger 129 spaced between the second and third stop mechanisms 145, 147, and the head 131 of the plunger 129 placed in abutting engagement with the distal end 151 of the second stop mechanism 145, a full displacement of the head 131 of the plunger 129 from its abutting engagement with the distal end 151 of the second stop mechanism 145 to an abutting engagement with the distal end 151 of the third stop mechanism 147 causes a known volume of gas, for example one-half liter of gas, to be expelled from the interior cavity 127 through the port 125 of the syringe 117.

Accordingly, the first and third stop mechanisms 143, 147 are spaced relative to each other such that, with the second stop mechanism 145 disposed at its deactivated station 157, the first and third stop mechanisms 143, 147 disposed at their activated stations 157, the head 131 of the plunger 129 spaced between the first and third stop mechanisms 143, 147, and the head 131 of the plunger 129 placed in abutting engagement with the distal end 151 of the first stop mechanism 143, a full displacement of the head 131 of the plunger 129 from its abutting engagement with the distal end 151 of the first stop mechanism 143 to an abutting engagement with the distal end 151 of the third stop mechanism 147 causes a known volume of gas, for example one liter of gas, to be expelled from the interior cavity 127 through port 125 of the syringe 117.

An FRC bag 161, preferably having a capacity of one and one-half liters, is connected in flow communication with FRC port 163 as depicted in FIGS. 5 and 6. The second stop mechanism 145 is structured to establish flow communication between FRC port 163 and the interior cavity 127 of the syringe 117 when the second stop mechanism 145 is disposed at its activated station 157. The second stop mechanism 145 is further structured to prevent flow communication between FRC port 163 and the interior cavity 127 when the second stop mechanism 145 is disposed at its deactivated station 155. More specifically, the second stop mechanism 145 includes a couple of passageways as indicated in the enlarged view of FIG. 6 wherein, as the second stop mechanism 145 is disposed at its activated station 157 and the head 131 of the plunger 129 is being displaced in the interior cavity 127, gas from the interior cavity 127 flows through first channel 165 and FRC port 163 into bag 161 and, simultaneously flows from bag 161 through FRC port 163 and second channel 167 back into interior cavity 127. However, when the second stop mechanism is disposed at its deactivated station, first and second channels 165, 167 are sealed off from the interior cavity 127 and no gas from the interior cavity 127 can flow through the channels 165, 167 or FRC port 163. First and third stop mechanisms 143, 147 do not include such passageways but serve only as mechanical stops that interfere with displacement of the head 131 of the plunger 129 in the interior cavity 127 when either or both of the first and third stop mechanisms 143, 147 are disposed at their activated stations 157.

The connection means 115 includes two configurations: a first connection configuration 171 when the present invention is being used for DLCO tests as depicted in FIG. 4, and a second connection configuration 173 when the present invention is being used for all other PFT calibration tests as depicted in FIG. 5.

With the first connection configuration 171 for DLCO tests, the connection means 115 includes a flexible conduit 175 removably connecting port 125 in flow communication with existing PFT equipment 177. The connection means 115 includes a T-adapter 179 connected in flow communication with a DLCO bag 181 that allows gas to flow from the bag 181 into conduit 175. The T-adapter 179 also includes a restrictor 183 that prevents gas from flowing from the PFT equipment 177 through the T-adapter 179 until the gas in bag 181 has been depleted. Application of the present invention to perform a DLCO test can be described as follows. Prior to performing this test, a carbon monoxide (CO) analyzer is calibrated and connected to the PFT equipment 177, as analyzer 185. In addition, a tank of three percent carbon monoxide, as gas source 187, is connected in flow communication with the PFT equipment 177. The first, second and third stop mechanisms 143, 145, 147 are disposed at their deactivated stations 155, the head 131 of the plunger 129 is placed in abutting engagement with the distal end 123 of the syringe 117, and DLCO bag 181 is filed with atmospheric air. This test is begun with a single intake stroke of the plunger 129 such that the head 131 is displaced from abutting engagement with the distal end 123 of the syringe 117 to abutting engagement with the proximal end 121 of the syringe 117. The plunger 129 is then allowed to rest for a period of ten to twelve seconds to allow the three percent carbon monoxide from the tank connected to the PFT equipment 177 to thoroughly mix with the one-half liter of atmospheric air in DLCO bag 181. At the end of the rest period, the test is completed with a single output stroke of the plunger 129 such that the head 131 is displaced from abutting engagement with the proximal end 121 of the syringe 117 to abutting engagement with the distal end 123 of the syringe 117, thereby expelling the gas mixture from the syringe 117 into the PFT equipment 177 for analysis by analyzer 185. Since the percent of carbon monoxide in the gas mixture is known, that quantity can be compared with the percent of carbon monoxide as determined by the carbon monoxide analyzer for purposes of calibrating the carbon monoxide analyzer.

With the second connection configuration 173 for all other calibration tests, the connection means 115 includes a flexible conduit 189 removably connecting port 125 in flow communication with the existing PFT equipment 177. Application of the present invention to perform the other tests for calibrating existing PFT equipment 177 can be described as follows. To perform the nitrogen washout test, FRC bag 161 attached to port 163 is filled with atmospheric air. The plunger 129 is displaced such that the head 131 thereof is disposed between first and second stop mechanisms 143, 145, and the first and second stop mechanisms 143, 145 are disposed at their activated stations 157. A tank of pure oxygen is connected to the PFT equipment 177, as gas source 187, and a nitrogen analyzer is connected in flow communication with the PFT equipment 177, as analyzer 185.

To perform the nitrogen washout test, the first and second stop mechanisms 143, 145 are disposed in their activated stations 157 and the plunger 129 is repeatedly displaced between first and second stop mechanisms 143, 145 to form successive abutting engagements therewith, which causes one-half liter increments of pure oxygen to inflow from the oxygen tank into the FRC bag 161. Outflow of gases from the FRC bag 161 is directed to the nitrogen analyzer 185 whereupon the percentage of nitrogen is determined by the nitrogen analyzer 185, and that percentage is mathematically converted to volume of nitrogen expelled by each stroke of the plunger 129. The nitrogen washout test is complete when the nitrogen analyzer 185 determines that the outflow contains zero-percent nitrogen indicating that the atmospheric air in the FRC bag 161 has been flushed out and replaced by pure oxygen. The sum of the successive volumes of nitrogen corresponding to the successive strokes of the plunger 129 equals the total volume. With this data from the nitrogen washout test, two values have been indirectly determined: VT and FRC. The displacement of the plunger head 131 simulates the TV of normal breathing.

Calibration of PFT equipment with the present invention also includes the procedure commonly referred to as the helium dilution test. The only difference between the helium dilution test and the nitrogen washout test is that the gas source 187 connected to the PFT equipment 177 comprises a tank of ten-percent helium instead of a tank of pure oxygen, and the analyzer 185 connected to the PFT equipment 177 comprises a helium analyzer instead of the nitrogen analyzer. The helium diffusion test is complete when the helium analyzer determines that the outflow contains ten-percent helium, indicating that the FRC bag 161 is free of atmospheric air and, instead, the inspired %He is equal to the expired %He. With this data from the helium dilution test, total volumes for FRC and TV are determined.

Calibration of PFT equipment 177 with the present invention also includes a procedure commonly referred to as the SVC test. This test is begun with the first and second stop mechanisms 143, 145 disposed at their deactivated stations 155, the third stop disposed at its activated station 157, and the head 131 of the plunger 129 in abutting engagement with the proximal end 121 of the syringe 117. The test involves a single stroke comprising displacement of the head 131 from abutting engagement with the proximal end 121 of the syringe to abutting engagement with the distal end 151 of the third stop mechanism 147. This procedures expels gas from the syringe 117 and simulates the SVC or FVC of a subject.

Summarizing, the system of the present invention includes three stopper pins located on top of a three-liter syringe at a known volume so a plunger starts and stops at the same location thereby assuring a reproducible volume. With the second stopper and the third stop mechanisms disposed at their activated stations, tidal volume and functional residual capacity are measured simultaneously through access provided by communication tubes. With the second and third stop mechanisms disposed at their deactivated stations and the first stop mechanism disposed at its activated station, vital capacity is measured when the plunger is fully extended and then depressed. With all three stop mechanisms in their deactivated stations, the system performs normally intended functions of a prior art three-liter syringe. The stop mechanisms function by pressing once to activate and then pressing again to deactivate.

The present invention provides the added benefit of operatively checking the integrity of all connected tubing, opening and closing of valves, and calculations of nitrogen and carbon monoxide by indicating the presence or absence or anomalous or expected results. In essence, the present invention simulates the action of the human lungs being monitored.

It is to be understood that while certain forms of the present invention have been illustrated and described herein, it is not to be limited to the specific forms or arrangement of parts described and shown.

The invention claimed is:

1. A system for calibrating pulmonary function test equipment, comprising:
   (a) syringe means, including a syringe having:
      (1) a cylindrically shaped sidewall,
      (2) a proximal end with an centrally located orifice,
      (3) a distal end with an output port,
      (4) an interior cavity, and
      (5) a plunger with a shaft slidably mounted through the orifice, a piston-type head mounted on one end of the shaft, and a handle mounted on an opposing end of the shaft;
   (b) a functional residual capacity port;
   (c) a rigid functional residual capacity bag connected in flow communication with the functional residual capacity port;
   (d) control means having a plurality of stop mechanisms, including:
      (1) a first stop mechanism,
      (2) a second stop mechanism structured to enable selective connection of the interior cavity in flow communication with the functional residual capacity port, and
      (3) a third stop mechanism, and
   (e) connection means structured to connect the syringe means to existing pulmonary function test equipment.

2. The system as described in claim 1, wherein each of the plurality of stop mechanisms includes:
   (a) a proximal end, extending exteriorly and transversely from the sidewall, and a distal end; and
   (b) a mounting mechanism wherein each stop mechanism is spring-mounted and slidably displaceable transverse to the sidewall wherein a distal end of the respective stop mechanism extends into the interior cavity of the syringe.

3. The system as described in claim 2, wherein each of the plurality of stop mechanisms further includes a latching mechanism structured to:
   (a) latch the respective stop mechanism in an activated station wherein the distal end of the respective stop mechanism extends into the interior cavity of the syringe; and
   (b) release the respective stop mechanism to automatically return to a deactivated station wherein the distal end of the respective stop mechanism does not extend into the interior cavity of the syringe.

4. The system as described in claim 1 wherein the plurality of stop mechanisms are axially spaced along the syringe such that a predetermined volume of the interior cavity is defined between that axial spacing of the respective stop mechanism and the distal end of the interior cavity.

5. The system as described in claim 1, wherein the connection means includes a first configuration wherein a flexible conduit removably connects the output port in flow communication with the existing pulmonary function test equipment, the flexible conduit including:
   (a) a T-adapter,
   (b) a collapsible diffusion lung capacity of carbon monoxide bag connected in flow communication with the T-adapter, and
   (c) a restrictor structured to prevent gas from flowing from the pulmonary function test equipment through the T-adapter until gas in the diffusion lung capacity of carbon monoxide bag has been depleted.

6. The system as described in claim 1, wherein the connection means includes a second configuration wherein a flexible conduit removably directly connects the output port in flow communication with the existing pulmonary function test equipment.

7. The system as described in claim 1, wherein the second stop mechanism includes first and second channels structured to selectively provide flow communication between the interior cavity to the functional residual capacity port.

8. A system for calibrating pulmonary function test equipment, comprising:
   (a) syringe means, including a syringe having:
      (1) a cylindrically shaped sidewall,
      (2) a proximal end with an centrally located orifice,
      (3) a distal end with an output port,
      (4) an interior cavity, and
      (5) a plunger with a shaft slidably mounted through the orifice, a piston-type head mounted on one end of the shaft, and a handle mounted on an opposing end of the shaft;
   (b) a functional residual capacity port;
   (c) a rigid functional residual capacity bag connected in flow communication with the functional residual capacity port;
   (d) control means having a plurality of stop mechanisms, including:
      (1) a first stop mechanism,
      (2) a second stop mechanism having first and second channels capable of connecting the interior cavity to the functional residual capacity port, and
      (3) a third stop mechanism, and
      (4) wherein each of said plurality of stop mechanisms includes:
         (A) a proximal end, extending exteriorly and transversely from the sidewall, and a distal end,
         (B) a mounting mechanism wherein each stop mechanism is spring-mounted and slidably displaceable transverse to the sidewall wherein a distal end of the respective stop mechanism extends into the interior cavity of the syringe, and
         (C) a latching mechanism structured to:
            (i) latch the respective stop mechanism in an activated station wherein the distal end of the respective stop mechanism extends into the interior cavity of the syringe, and
            (ii) release the respective stop mechanism to automatically return to a deactivated station wherein the distal end of the respective stop mechanism does not extend into the interior cavity of the syringe, and (D) wherein the plurality of stop mechanisms are axially spaced along the syringe such that a predetermined volume of the interior cavity is defined between that axial spacing of the respective stop mechanism and the distal end of the interior cavity; and (e) connection means having a first configuration and a second configuration wherein:

(1) the first configuration includes a flexible conduit removably connecting the output port in flow communication with existing pulmonary function test equipment, the flexible conduit including:

(A) a T-adapter, (B) a diffusion lung capacity of carbon monoxide bag connected in flow communication with the T-adapter, and (C) a restrictor structured to prevent gas from flowing from the pulmonary function test equipment through the T-adapter until the gas in the diffusion lung capacity of carbon monoxide bag has been depleted, and (2) the second configuration includes a flexible conduit removably connecting output port in flow communication with the existing pulmonary function test equipment.

9. A method for calibrating existing pulmonary function test equipment, including the steps of:

(a) providing a system having:

(1) a syringe having an output port and a plunger with a head that is displaceable within an interior cavity of the syringe, (2) a plurality of stop mechanisms, each having an activated station wherein a distal end of the respective stop mechanism interferes with displacement of the plunger head in the interior cavity of the syringe, and a deactivated station wherein the distal end of the respective stop mechanism does not interfere with displacement of the plunger head in the interior cavity of the syringe, (3) connection means having a flexible conduit connecting the output port in flow communication with the existing pulmonary function test equipment, (4) a functional residual capacity port, (5) a functional residual capacity bag connected in flow communication with the functional residual capacity port, and (6) one of the stop mechanisms connecting the interior cavity in flow communication with the functional residual capacity port when that one stop mechanism is disposed at the respective activated station thereof; and (b) connecting the output port to existing pulmonary function test equipment;

(c) selectively placing the plurality of stop mechanisms in their respective activated and deactivated stations as appropriate; and (d) calibrating the existing pulmonary function test equipment by using the plunger to perform various tasks to simulate the breathing functions of a subject.

* * * * *